(12) United States Patent
Degenstein

(10) Patent No.: US 9,008,911 B2
(45) Date of Patent: Apr. 14, 2015

(54) ELECTRICAL LIMITATION OF A STEERING GEAR TRAVEL PATH

(71) Applicant: GM Global Technology Operations LLC, Detroit, MI (US)

(72) Inventor: Thomas Degenstein, Mainz (DE)

(73) Assignee: GM Global Technology Operations LLC, Detroit, MI (US)

( * ) Notice: Subject to any disclaimer, the term of this patent is extended or adjusted under 35 U.S.C. 154(b) by 187 days.

(21) Appl. No.: 13/668,118

(22) Filed: Nov. 2, 2012

(65) Prior Publication Data

US 2013/0124043 A1 May 16, 2013

(30) Foreign Application Priority Data

Nov. 2, 2011 (DE) .......................... 10 2011 122 772

(51) Int. Cl.
*B62D 3/00* (2006.01)
*B62D 6/00* (2006.01)
*B62D 15/02* (2006.01)
*B62D 3/12* (2006.01)
*B62D 5/04* (2006.01)

(52) U.S. Cl.
CPC ........ *B62D 15/02* (2013.01); *B62D 3/12* (2013.01); *B62D 5/0469* (2013.01)

(58) Field of Classification Search
CPC ........ B62D 15/02; B62D 3/12; B62D 5/0469; B62D 6/00; B62D 6/008; G06Q 30/02; H04W 4/02; H04W 4/043
USPC ............................. 701/41; 180/400, 422, 434
See application file for complete search history.

(56) References Cited

U.S. PATENT DOCUMENTS

| | | | | |
|---|---|---|---|---|
| 4,771,846 | A * | 9/1988 | Venable et al. | 180/422 |
| 6,026,926 | A | 2/2000 | Noro et al. | |
| 6,097,286 | A * | 8/2000 | Discenzo | 340/465 |
| 6,164,405 | A * | 12/2000 | Sakata | 180/400 |
| 6,257,602 | B1 | 7/2001 | Joerg et al. | |
| 6,588,770 | B1 | 7/2003 | Lee | |
| 7,389,850 | B2 * | 6/2008 | Fleck et al. | 180/444 |
| 7,445,080 | B2 | 11/2008 | Ryu | |
| 7,668,635 | B2 * | 2/2010 | Raksincharoensak et al. | 701/41 |

(Continued)

FOREIGN PATENT DOCUMENTS

| | | | |
|---|---|---|---|
| DE | 19908323 | A1 | 8/2000 |
| DE | 10221721 | A1 * | 11/2003 |

(Continued)

OTHER PUBLICATIONS

German Patent Office, German Search Report for Application No. 102011122722.9, dated Jun. 13, 2012.

*Primary Examiner* — Calvin Cheung
*Assistant Examiner* — Angelina Shudy
(74) *Attorney, Agent, or Firm* — Ingrassia Fisher & Lorenz, P.C.

(57) ABSTRACT

A method for an electrical limitation of the travel path of a steering gear in a wheeled vehicle, in particular a passenger car, which exhibits a steering drive, is provided. The method includes adjusting the steering gear in a first direction and acquiring a first maximum travel path in the first direction. The method includes prescribing a first limiting value based upon this acquired first maximum travel path and electrically limiting the travel path of the steering gear in the first direction based upon the first limiting value. The first maximum travel path is acquired by the steering drive.

15 Claims, 1 Drawing Sheet

(56) References Cited

U.S. PATENT DOCUMENTS

| | | | |
|---|---|---|---|
| 7,798,279 B2* | 9/2010 | Williams | 180/402 |
| 2004/0039507 A1* | 2/2004 | Yao et al. | 701/41 |
| 2004/0148078 A1* | 7/2004 | Nakano et al. | 701/41 |
| 2004/0211618 A1* | 10/2004 | Ogawa et al. | 180/402 |
| 2005/0082108 A1* | 4/2005 | Husain | 180/402 |
| 2008/0281490 A1* | 11/2008 | Wittig | 701/41 |
| 2010/0241314 A1* | 9/2010 | Bohm et al. | 701/41 |
| 2012/0029771 A1* | 2/2012 | Mackin et al. | 701/41 |
| 2012/0330506 A1* | 12/2012 | Kleinhans et al. | 701/36 |
| 2013/0124044 A1* | 5/2013 | Degenstein | 701/41 |
| 2014/0129089 A1* | 5/2014 | Takeuchi et al. | 701/41 |

FOREIGN PATENT DOCUMENTS

| | | |
|---|---|---|
| DE | 10244067 A1 | 4/2004 |
| DE | 10261001 A1 | 7/2004 |
| DE | 102008055900 A1 | 6/2009 |
| DE | 102008040202 A1 * | 1/2010 |

* cited by examiner

ELECTRICAL LIMITATION OF A STEERING GEAR TRAVEL PATH

CROSS-REFERENCE TO RELATED APPLICATION

This application claims priority to German Patent Application No. 10 2011 122 772.9, filed Nov. 2, 2011, which is incorporated herein by reference in its entirety.

TECHNICAL FIELD

The present disclosure relates to a method for electrically limiting the travel path of a steering gear in a wheeled vehicle, in particular a passenger car, as well as a to a steering gear set up for implementing such a method.

BACKGROUND

The free space for a wheel in a wheel case limits the possible steering angle. Therefore, the steering angle is limited, generally to prevent the steered wheel from touching the wheel case.

In order to prescribe a permissible steering angle for several identically constructed vehicles under varying dynamic conditions, attention must be paid to dynamic changes on the one hand, for example compression, and also to component and assembly tolerances between the different vehicles on the other, for example a variable assembly distance between the wheel and wheel case. These dynamic and tolerance-induced safety distances for the permissible steering angle increase the minimum turning radius of the vehicle.

Known from DE 10 2008 055 900 A1 is a steering gear for a motor vehicle in which a maximum steering angle can be electronically set. In order to bypass tolerances, the maximum steering travel is measured after final assembly, the steering angle from right to left is defined, and this ascertained maximum steering angle is reduced by the necessary free travel for the wheels.

Accordingly, it is desirable to improve the electric limitation on the travel path of a steering gear in a wheeled vehicle. In addition, other objects, desirable features and characteristics will become apparent from the subsequent summary and detailed description, and the appended claims, taken in conjunction with the accompanying drawings and this background.

SUMMARY

In one of various aspects of the present disclosure, a steering gear of a wheeled vehicle, in particular a passenger car or truck, which exhibits a steering drive, is adjusted in a first direction, a first maximum travel path in the first direction is acquired, a first limiting value is prescribed based upon this acquired first maximum travel path, and the travel path of the steering gear in the first direction is electrically limited based upon the first limiting value, wherein the first maximum travel path is acquired by the steering drive.

Because the steering drive itself is used to acquire a maximum travel path, the latter can be acquired very easily and precisely. This advantageously makes it easier to repeat the acquisition and presetting, in one example, in an automated way, when one or more components of the steering gear whose formation and/or assembly influences the maximum travel path of the steering gear have been changed out in the tolerance chain of the steering gear. In like manner, the acquisition and presetting can be performed quickly and precisely during an initial assembly of the vehicle.

In an exemplary embodiment, the steering drive exhibits an acquisition means for acquiring a travel path of the steering gear. To this end, the acquisition means can exhibit in one example an incremental or absolute rotational angle sensor, for example to acquire the turning of a steering wheel. In like manner, the acquisition means can acquire the travel of a steering rack or link, the steering angle of a steered wheel or some other kinematic variable for the steering gear that changes given a steering movement of its wheels.

Additionally or alternatively, the acquisition means can be set up to acquire a force that arises or changes during a steering movement of the steering gear. To provide a more cohesive portrayal, an anti-parallel couple of forces, i.e., a torque, is also referred to generally as a force. Accordingly, the acquisition means can exhibit a force sensor, in one example, a moment sensor, for example to acquire a torque in a steering rod, a traction/compression force in a steering rack or link or the like.

Once a maximum travel path has been reached, for example given physical contact between the steered wheel and wheel case, steering link and wheel rim or the like, a force in the steering gear rises to counter any further travel motion. The acquisition means of the steering gear can acquire this rise in force and the travel path where it is encountered, and thereby acquire the maximum travel path in a simple and precise manner.

In one exemplary embodiment, the steering gear exhibits a steering means, in one example, a steering wheel, a joystick or the like, so as to steer one or more wheels of the vehicle, in one example, to turn them around at least one axis.

In one exemplary embodiment, the steering drive exhibits one or more electric actuators, in one example, one or more electromotors and/or electromagnets, which are actuated based upon an acquired activation of the steering means, in one example, an adjustment of the steering means introduced by the driver and/or a force exerted on the steering means by the driver. The steering drive can also exhibit one or more hydraulic actuators, which are electrically controlled, for example via electric control valves or the like. Such actuators are also referred to as electric actuators here.

The steering means can be mechanically and/or hydraulically coupled with the wheel(s), in one example, by means of a steering rod, steering rack, steering links and the like. One or more electric actuators of the steering drive can be provided to support a steering activation of the steering means by a driver, in that the forces they apply overlap the forces exerted by the driver ("electric power steering", EPS). In one example, a servo motor can impose an additional torque on a steering rod or steering box, or a force in the direction of movement of a steering rack. In like manner, the steering means can also be decoupled from the wheel(s) ("drive-by-wire"), in that the wheel(s) is/are only moved by the actuator(s), and forces exerted by the driver on the steering means are not mechanically transmitted to the wheel(s).

In another exemplary embodiment, a maximum travel path can be acquired based upon an electrical variable, in one example, a current, a current consumption, a voltage, a phase angle or the like, which arises or changes in one or more electrical actuators given a steering movement of the steering gear. For example, the current or power consumption of a servo motor increases if the steered wheel and wheel case, steering link and wheel rim or the like come into physical contact with each other at a maximum travel path of the steering gear.

The travel path of the steering gear can be electrically limited by the steering drive. In one example, the steering drive can exert a force on the steering gear, for example, the steering means, which counteracts an exceeding of the limiting value. The force can generally rise sharply close to the limiting value to electrically simulate an impact. For example, the rise in force can here depend on difference between the travel path and limiting value, whether proportionally, exponentially or in some other relation. In a drive-by-wire steering gear, a feedback actuator can additionally or alternatively impose a counterforce on the steering means, and/or the travel path of a positioning actuator that steers the wheel(s) can be limited.

In like manner, the travel path of the steering gear can also be electrically limited by adjusting one or more mechanical stops, in one example, with electromotors and/or electromagnets or hydraulics.

In one exemplary embodiment, the steering gear is additionally adjusted in a second direction substantially opposite the first direction, and a second maximum travel path is acquired in this second direction by the steering drive. Based upon this acquired second maximum travel path, a second limiting value is prescribed, and a travel path of the steering gear is electrically limited in the second direction based upon the second limiting value.

The first and second limiting value can be prescribed together, in one example, symmetrically, based upon the acquired first and second maximum travel path. In one exemplary embodiment, the first and second limiting value can be varyingly prescribed. In this way, in one example, asymmetries in the steering gear can be taken into account.

In one example, a limiting value can be prescribed based upon an acquired maximum value by decreasing the acquired maximum travel path by a safety distance, which can be prescribed for example, based upon dynamic boundary conditions, such as a compression or the like. Additionally or alternatively, the safety distance can also be prescribed based upon a speed, acceleration, traveling direction (forward, reverse) or the like, so as to enable larger travel paths, and hence smaller turning radii, for example at low speeds and/or when in reverse, such as in the process of parking.

In another exemplary embodiment, the steering drive adjusts the steering gear in the first and/or second direction, so as to acquire a maximum travel path. This advantageously enables an automated acquisition and presetting, and hence an automated setting, of the electrical travel path limitation of the steering gear, in one example, when changing out a component in the tolerance chain.

When a maximum travel path has been limited by contact with at least one flexible component in the steering gear, for example by contact between a thin-walled plastic wheel case and a rubber tire, acquisition can be hampered by the steering drive, in one example, by the rise in a force or electrical variable, since the force or electrical variable changes with a relatively small gradient. For example, in order to also be able to precisely acquire a maximum travel path even given a travel path limitation by at least one flexible component of the steering gear, one exemplary embodiment involves securing one or more stop elements to the steering gear, in one example, temporarily, before adjusting the steering gear in the first and/or second direction, which on their part define the maximum travel path when they come into contact with a component or stop element. In one example, such stop elements can be attached to a wheel rim, a tire, wheel case, brake pad, stabilizer, steering link or the like. The stop element(s) can for example, be detachably secured to the steering gear, for example by clamping, screwing or the like. In like manner, they can also be integrally joined with the steering gear, for example through adhesive bonding, welding or the like, whether permanently, or temporarily if the integral joint is destroyed.

As stated above, safety distances that generally take into account dynamic boundary conditions can be considered through calculation while presetting the limiting value based upon the acquired maximum travel path. Additionally or alternatively, a maximum travel path as defined by one or more stop elements can already be diminished by a prescribed variable relative to a maximum travel path as defined by the steering gear without stop elements. To this end, the stop element(s) can be correspondingly enlarged, and thereby already exhibit the safety distances mentioned above. Additionally or alternatively, stop elements that diminish the maximum travel path by a prescribed variable can also simulate other components, in one example, tire sizes, and thereby directly acquire the latter.

A limiting value can additionally or alternatively be prescribed based upon a prescribable parameter for the wheeled vehicle, in one example a tire size. For example, if a maximum travel path with a narrower tire and/or stop elements is acquired, a later switch to a wider tire can be accounted for by prescribing the limiting value based upon the widest tire permitted for the vehicle.

A person skilled in the art can gather other characteristics and advantages of the disclosure from the following description of exemplary embodiments that refers to the attached drawings, wherein the described exemplary embodiments should not be interpreted in a restrictive sense.

BRIEF DESCRIPTION OF THE DRAWINGS

The various embodiments will hereinafter be described in conjunction with the following drawing figures, wherein like numerals denote like elements, and wherein.

DETAILED DESCRIPTION

The following detailed description is merely exemplary in nature and is not intended to limit the present disclosure or the application and uses of the present disclosure. Furthermore, there is no intention to be bound by any theory presented in the preceding background or the following detailed description.

Figure 1:
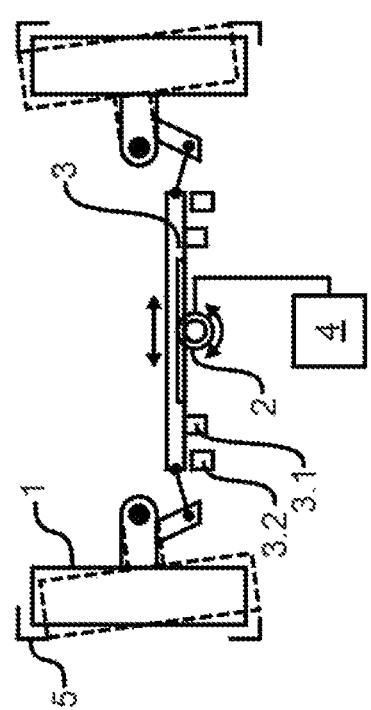
FIG. 1 is a steering gear according to an exemplary embodiment of the present disclosure.

FIG. 1 presents an exemplary view of a steering gear for a passenger car according to an exemplary embodiment of the present disclosure with two wheels 1 that are steered by means of a steering rack 3 and housed in wheel cases 5. In order to shift the steering rack 3, an electromotor 2 of a steering drive engages the latter, which supports a steering motion of a steering rod (not shown) operatively connected with a steering wheel, or moves the steering rack decoupled from the steering wheel by itself based upon an acquired steering activation of the steering wheel.

In addition to the electromotor 2, the steering drive in one example, encompasses a controller 4 connected thereto in terms of signal. The latter actuates the electromotor 2, and receives information from it about a current travel path x (see FIG. 3), for example a position of the steering rack 3 or a rotational angle of the motor 2, and a force or electrical variable currently applied thereto, for example an imposed torque, a power input or the like.

In order to electrically limit the travel path of this steering gear, a stiff stop element (not shown) is first secured to the flexible wheel case 5 in a contact area with the wheel 1 in step S10 at the end of a passenger car assembly process. In like manner, a stop element can be attached to a tire, a wheel rim and/or a brake caliper of the wheel 1, the steering link and/or a stabilizer in an undepicted modification. The stop(s) can be removed again after the method described below has been implemented, and reattached during renewed implementation.

In step S20, the steering gear is then automatically adjusted in a first direction, as denoted by the dashed line on FIG. 1. To this end, the controller 4 actuates the electromotor 2, which shifts the steering rack 3, thereby moving the wheels 1.

In this case, the travel path x (see FIG. 3), for example the shifting of the steering rack 3 out of a center position, is acquired in the controller 4, as is the torque here imposed by the electromotor 2, or the current y here taken up by the electromotor 2. In like manner, the torque arising in a steering rod could also be acquired in the process of manual steering.

Figure 2:
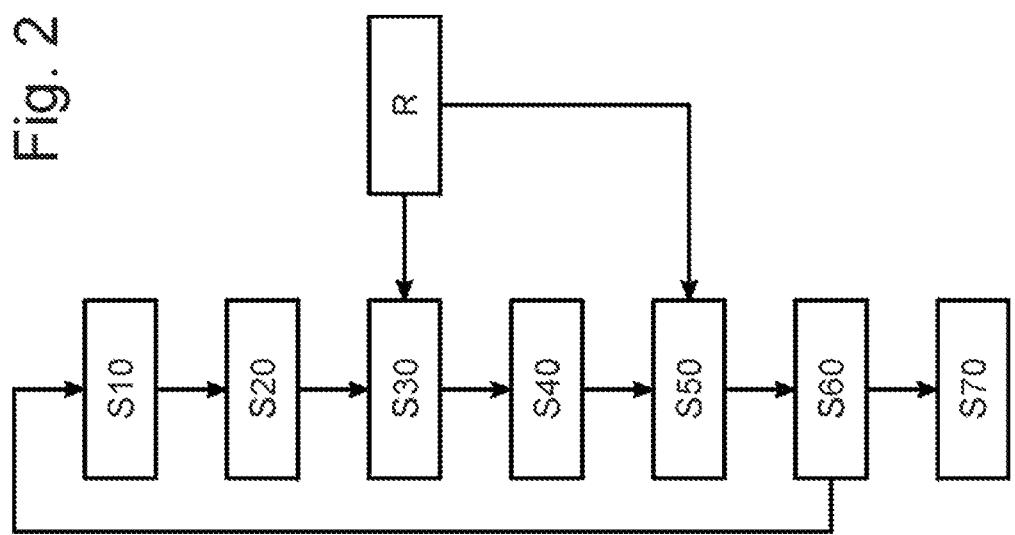
FIG. 2 is a method for electrically limiting a travel path of the steering gear on FIG. 1 according to an exemplary embodiment of the present disclosure.
Figure 3:
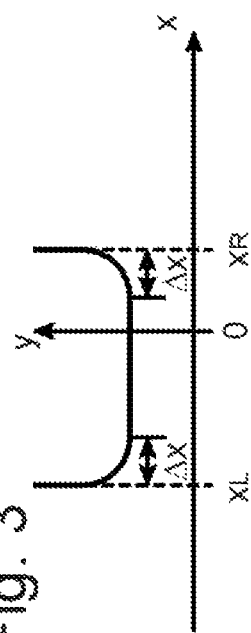
FIG. 3 is the travel path of the steering gear on FIG. 1.

As evident from the progression of the force or electrical variable y over the travel path x depicted on FIG. 3, the variable y rises sharply when the wheel 1 comes into contact with the stop element on the wheel case 5 (FIG. 3: $x_L$). The travel path over which the variable y or its gradient exceeds a prescribed value is acquired in the controller 4 based upon the force or electrical variable y as the first maximum travel path in the first direction (FIG. 2: S20). As a consequence, the first maximum travel path $x_L$ is acquired based upon the force or electrical variable y by the steering drive, in one example, its controller 4.

As described above, it is defined by the stop element temporarily secured to the steering gear, and can be diminished by a prescribed variable in relation to a maximum travel path that would arise without a stop element, in that the stop element is correspondingly enlarged, for example in order to mechanically simulate a wider tire and/or a dynamic compression.

In step S30, a first limiting value ($x_L + \Delta x$) is then prescribed based upon this acquired first maximum travel path $x_L$, wherein the safety distance $\Delta x$ is prescribed, for example, based upon dynamic boundary conditions, such as a compression in one example. Additionally or alternatively, the limiting value can also be prescribed based upon a prescribable parameter for the passenger car, in one example, a tire size R, for example by prescribing the safety distance $\Delta x$ based upon the tire size ($\Delta x = \Delta x(R)$). As explained above, dynamic boundary conditions, parameters and the like can similarly be taken into account via calculation and/or with corresponding stop elements.

In step S40, the steering gear is automatically adjusted in a second direction when the controller 4 actuates the electromotor 2, which shifts the steering rack 3, and thereby moves the wheels 1.

The travel path x (see FIG. 3) and the force or electrical variable y is here again acquired in the controller 4, and rises sharply when the wheel 1 comes into contact with the stop element on the wheel case 5 (FIG. 3: $x_R$). The travel path over which the variable y or its gradient exceeds a prescribed value is acquired in the controller 4 based upon the force or electrical variable y as the second maximum travel path in the second direction (FIG. 2: S40). As evident, the first (left) and second (right) maximum travel path are not symmetrical to the center position of the steering gear, since production and assembly tolerances, for example, yield more free space between wheel 1 and wheel case 5 in the first direction.

In step S50, a second limiting value ($x_R - \Delta x$) is prescribed based upon this acquired second maximum travel path $x_R$, wherein the safety distance $\Delta x$ is prescribed as explained above with respect to the first limiting value. As evident from FIG. 3, the first limiting value ($x_L + \Delta x$) and the second limiting value ($x_R + \Delta x$) can be variably prescribed ($|x_L + \Delta x| \neq |x_R - \Delta x|$).

If at least one component of the steering gear whose formation and/or assembly influences the maximum travel path of the steering gear has been changed out, for example the steering rack 3 (FIG. 2: S60), steps S10 to S50 are automatically repeated.

In step S70, the travel path of the steering gear is subsequently electrically limited to the first limiting value ($x_L + \Delta x$) in the first direction, and to the second limiting value ($x_R - \Delta x$) in the second direction.

To this end, the electromotor 2 can impose a counterforce that counteracts, in one example, prevents, continued steering by the driver after the respective limiting value has been reached, as explained above. In addition, the travel path of the electromotor 2 can be limited accordingly in the case of a drive-by-wire steering gear. In an exemplary embodiment, the counterforce imposed by the electromotor 2 as a supporting actuator or, given a drive-by-wire steering gear, by a feedback actuator that actuates the steering wheel (not shown) can intensify as the respective limiting value is approached, for example proportionally or exponentially, thereby making it increasingly more difficult for the driver to continue turning in proximity to the electrical stop.

Additionally or alternatively to such a counterforce, which electrically simulates a stop and is used by the steering drive to electrically limit the travel path of the steering gear, a limitation can be provided in the form of interacting stops 3.1, 3.2, for example on the steering rack 3 and the passenger car. The travel path can also be electrically adjusted by shifting the stops 3.2 fixed in place in the passenger car by means of electromotors or electromagnets.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the present disclosure in any way. Rather, the foregoing detailed description will provide those skilled in the art with a convenient road map for implementing an exemplary embodiment, it being understood that various changes may be made in the function and arrangement of elements described in an exemplary embodiment without departing from the scope of the present disclosure as set forth in the appended claims and their legal equivalents.

What is claimed is:

1. A method for electrically limiting a steering gear travel path of a steering gear in a wheeled vehicle with a steering drive, comprising:
   adjusting, by a controller, the steering gear in a first direction;
   acquiring, by the controller, a first maximum travel path in the first direction with the steering drive;
   prescribing, by the controller, a first limiting value based upon this acquired first maximum travel path; and
   electrically limiting the travel path of the steering gear in the first direction based upon the first limiting value.
   adjusting the steering gear in a second direction;

acquiring a second maximum travel path in the second direction via the steering drive;
prescribing a second limiting value based upon this acquired second maximum travel path; and
electrically limiting the steering gear travel path in the second direction based upon the second limiting value,
wherein the first and second limiting values are variably prescribed.

2. The method according to claim 1, further comprising:
acquiring a maximum travel path with the steering drive based upon at least one of a torque and a current.

3. The method according to claim 1, wherein the steering drive adjusts the steering gear in the first and second direction.

4. The method according to claim 3, further comprising:
securing at least one stop element temporarily to the steering gear which defines the first maximum travel path and second maximum travel path before the steering gear is adjusted in the first direction and second direction.

5. The method according to claim 4, wherein the first maximum travel path and the second maximum travel path defined by the at least one stop element are diminished by a prescribed variable.

6. The method according to claim 1, wherein the first limiting value is further prescribed based upon a tire size of the vehicle.

7. The method according to claim 1, further comprising:
repeating the adjustment of the steering gear in the first direction, the acquisition of The first maximum travel path, and the prescribing of the first limiting value based upon the acquired first maximum travel path if at least one component of the steering gear has been changed out.

8. The method according to claim 1, wherein the steering drive is provided for purposes of at least transmission and feedback relative to a steering activation of a steering means introduced by the driver.

9. The method according to claim 1, wherein the first maximum travel path of the steering gear is electrically limited by at least one of the steering drive and an electrically adjustable stop.

10. A steering gear for a passenger car, comprising:
a steering drive;
a device for electrically limiting a steering gear travel path; and
a controller that:
adjusts the steering gear in a first direction;
acquires a first maximum travel path in the first direction with the steering drive;
prescribes a first limiting value based upon this acquired first maximum travel path; and
electrically limits the steering gear travel path in the first direction based upon the first limiting value,
adjusts the steering gear in a second direction; acquires a second maximum travel path in the second direction via the steering drive;
prescribes a second limiting value based upon this acquired second maximum travel path; and
electrically limits the steering gear travel path of the steering gear in the second direction based upon the second limiting value,
wherein the steering drive adjusts the steering gear in the first direction and the second direction.

11. The method according to claim 10, wherein the first limiting value and the second limiting value are variably prescribed.

12. A method for electrically limiting the steering gear travel path of a steering gear in a vehicle with a steering drive, comprising:
adjusting, by the controller, the steering gear in a first direction and a second direction;
acquiring, by the controller, a first maximum travel path in the first direction with the steering drive;
acquiring, by the controller, a second maximum travel path in the second direction via the steering drive;
prescribing, by the controller, a first limiting value based upon this acquired first maximum travel path;
prescribing, by the controller, a second limiting value based upon this acquired second maximum travel path;
electrically limiting, by the controller, the steering gear travel path in the first direction based upon the first limiting value; and
electrically limiting the travel path of the steering gear in the second direction based upon the second limiting value,
electrically limiting, by the controller, the steering gear travel path in the second direction based upon the second limiting value,
wherein the first maximum travel path and second maximum travel path defined by the at least one stop element are diminished by a prescribed variable.

13. The method according to claim 12, further comprising:
securing at least one stop element temporarily to the steering gear which defines the first maximum travel path and the second maximum travel path before the steering gear is adjusted in the first direction and the second direction.

14. The method according to claim 12, further comprising:
repeating the adjustment of the steering gear in the first direction and the second direction, the acquisition of the first maximum travel path and the second maximum travel path, and the prescribing of the first limiting value and second limiting value if at least one component of the steering gear has been changed out.

15. The method according to claim 12, wherein at least one of the first maximum travel path and second maximum travel path of the steering gear is electrically limited by at least one of the steering drive and an electrically adjustable stop.

* * * * *